Dec. 7, 1937.  W. R. THOMSON  2,101,109
METHOD OF AND APPARATUS FOR THE EXTRACTION OF LIQUID FROM MATERIALS
Filed Jan. 23, 1935  4 Sheets-Sheet 1
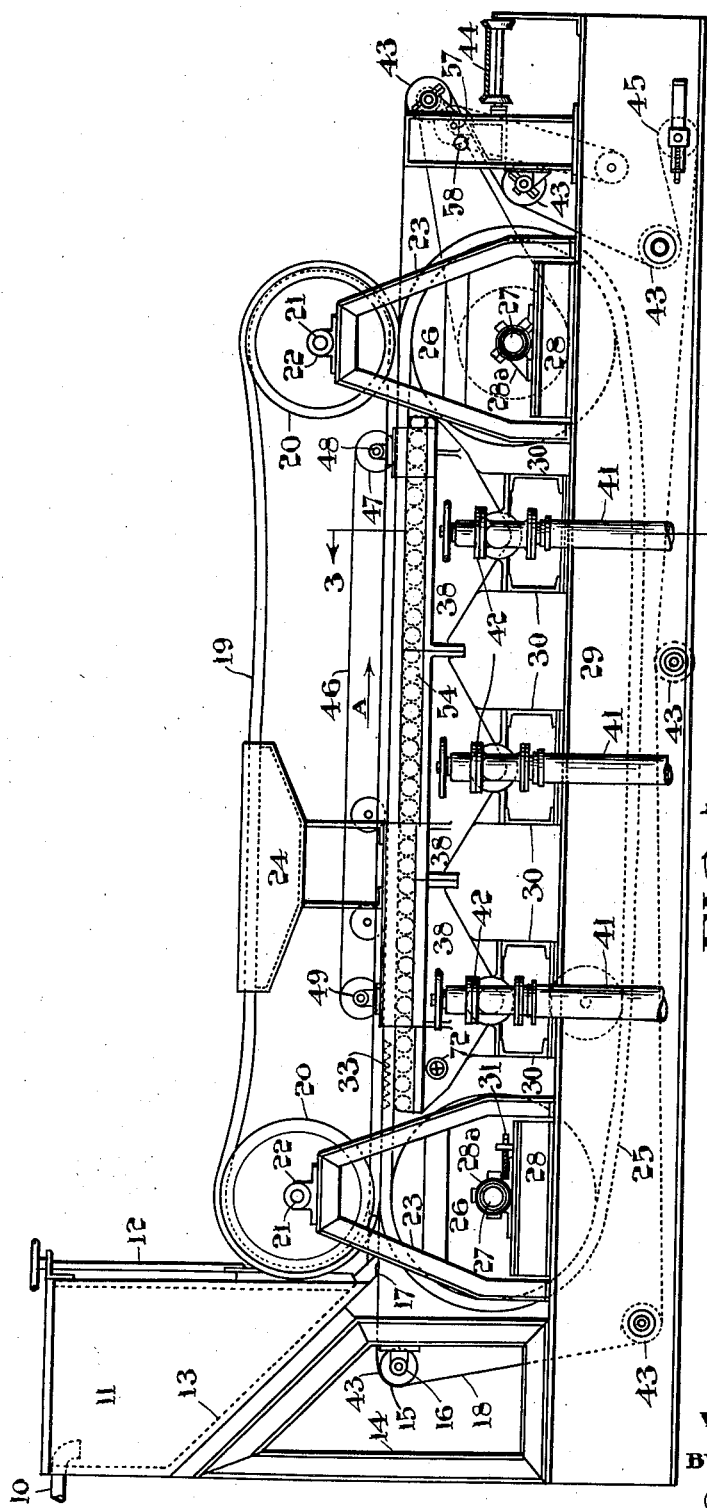
INVENTOR
WILLIAM R. THOMSON
BY J. L. O'Connell
ATTORNEY Dec. 7, 1937.    W. R. THOMSON    2,101,109
METHOD OF AND APPARATUS FOR THE EXTRACTION OF LIQUID FROM MATERIALS
Filed Jan. 23, 1935    4 Sheets-Sheet 2

INVENTOR
WILLIAM. R. THOMSON
BY J. D. O'Connell
ATTORNEY

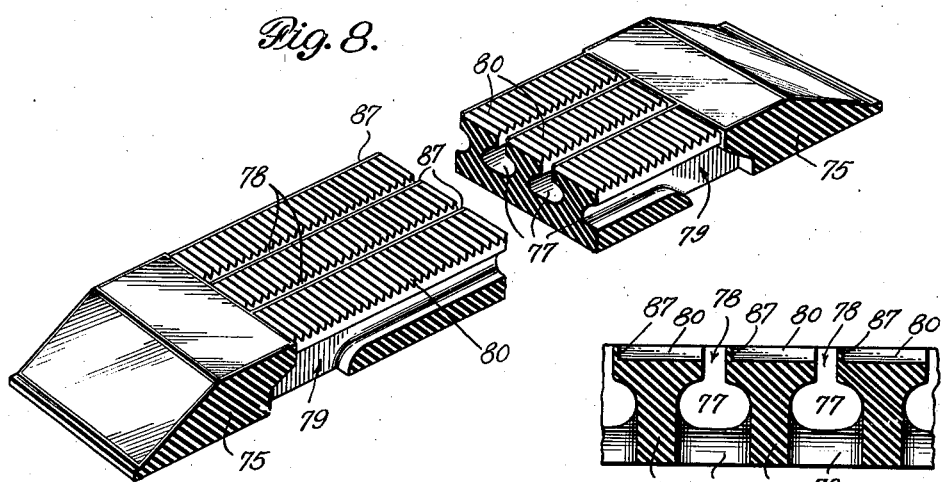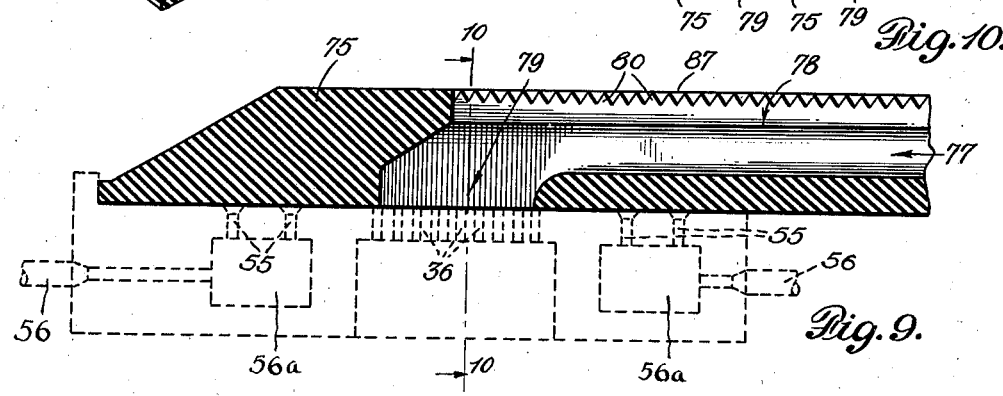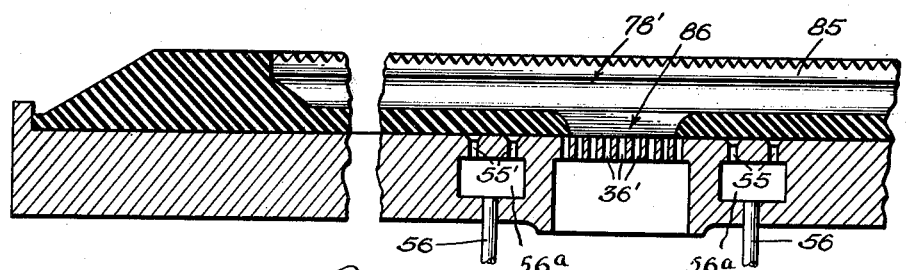

Dec. 7, 1937.  W. R. THOMSON  2,101,109
METHOD OF AND APPARATUS FOR THE EXTRACTION OF LIQUID FROM MATERIALS
Filed Jan. 23, 1935  4 Sheets-Sheet 4
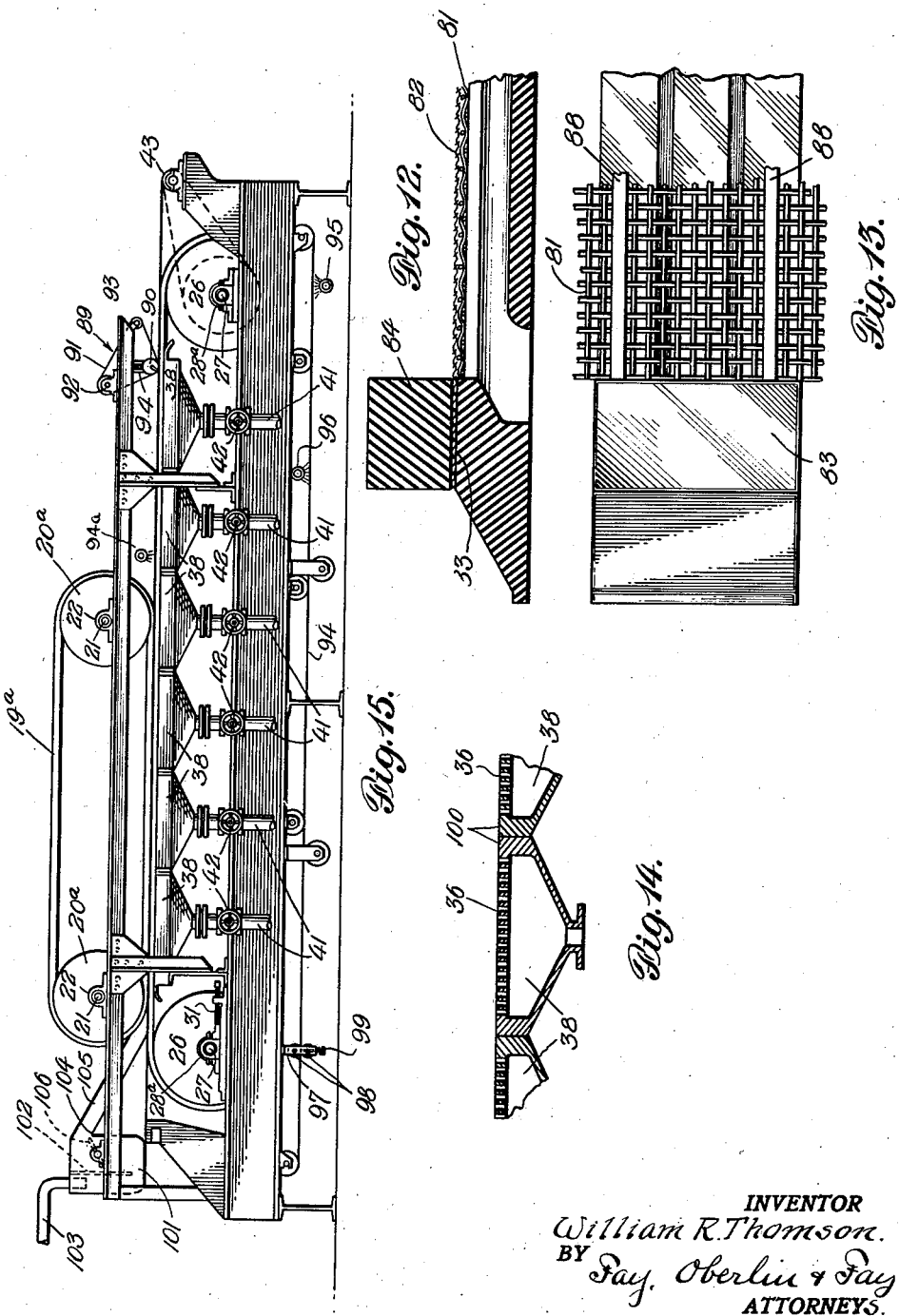
INVENTOR
William R. Thomson.
BY Fay, Oberlin & Fay
ATTORNEYS.

Patented Dec. 7, 1937

2,101,109

UNITED STATES PATENT OFFICE 2,101,109

METHOD OF AND APPARATUS FOR THE EXTRACTION OF LIQUID FROM MATERIALS

William R. Thomson, Toronto, Ontario, Canada

Application January 23, 1935, Serial No. 2,977

13 Claims. (Cl. 210—197)

This application is a continuation in part of my copending application Serial No. 707,162, filed January 18, 1934.

This invention relates, as indicated, to a method of and apparatus for the extraction of liquid from materials, and has for its principal object the provision of a more efficient method and apparatus for separating the liquid from the solid constituents of materials such as sludges and slurries.

It is a principal object of my invention to provide a method of and apparatus of the character described which is characterized by the fact that the material from which the liquid is to be extracted is supported during such extraction process in a substantially horizontal plane so that the action of gravity upon the liquid component may be utilized to its fullest advantage.

It is a further and more particular object of my invention to provide a method of and apparatus for removing the liquid component from materials of the character described, by means which are relatively simple in construction and capable of being manufactured and operated at relatively low cost.

It is a particular object of my invention to provide a fluid extraction apparatus which may be easily controlled and regulated as well as being continuous in its operation.

It is a further object of my invention to provide a method of and apparatus for treating material of the character described in which the physical structure of such material is intermittently disturbed in a mechanically vibratory manner in order to facilitate the passage of air therethrough and a consequent drying of the same.

It is another object of this invention to provide a fluid extraction apparatus in which the filtering medium forming part of the same will be easily inspected and cleaned. A still further object is to provide an apparatus which will dehydrate materials uniformly with respect to the amount of material treated and the dryness of the same.

It is a further object of my invention to provide an apparatus of the character described in which a maximum amount of air flow through the materials may be secured by the expenditures of a minimum amount of power in the form of suction, etc.

It is a further object of this invention to provide an apparatus of the character described, which will efficiently employ a relatively fine and consequently structurally weak filtering medium, particularly necessary when carrying out the process of removing the liquid from relatively finely divided solids.

It is a further object of my invention to provide a method of and apparatus for performing the above referred to process which will subject both surfaces of a layer of finely divided solid material to air flow so as to more efficiently dehydrate the entire layer.

It is a further object of this invention to provide an apparatus characterized by the fact that the filtering medium employed may be variously treated or reconditioned during the continuous operation of the apparatus and between the times when sections of such mediums are successively in operative engagement with the material being dehydrated.

It is a further object of my invention to provide a process of the character described, characterized by the fact that the material being treated is subjected to streams of treating medium, such as air, respectively flowing in opposite directions in different stages of the treatment, whereby a more efficient operation such as dehydration may be effected.

It is a further object of my invention to provide a method of and apparatus for treating material of the character described in the above manner, characterized by the fact that the various stages in the process may be carried on in a somewhat intermittent fashion, whereby superior results are secured.

To the accomplishment of the foregoing and related ends, said invention, then consists of the means hereinafter fully described and particularly pointed out in the claims; the annexed drawings and the following description setting forth in detail certain mechanism exemplifying this invention, such disclosed mechanism constituting, however, but one of the various applications of the principle of this invention.

In said annexed drawings:—

Fig. 1 is a side elevation of one form of my invention.

Fig. 5 is a cross section of one part of the mat showing the connection between the mat ports and the suction box ports.

Fig. 6 shows a modified type of valve connection to the suction or blowing boxes to allow flexibility in the operation of the machine.

Fig. 7 is a plan view of one type of mat which provides support for the filter medium belt.

Fig. 8 is a broken symmetric view of another form of mat constructed in accordance with the principles of my invention.

Fig. 9 is a fragmentary sectional view drawn to a slightly enlarged scale of the mat shown in Fig. 8, showing the same adjacent to a suction box with which the same is designed to co-operate.

Fig. 10 is a transverse sectional view of the mat shown in Fig. 9 taken on a plane substantially indicated by the line 10—10.

Fig. 11 is a broken sectional view similar to Fig. 9 but showing a different form of mat and the suction box and supporting means for the mat designed to be employed in conjunction therewith.

Fig. 12 is a sectional view of a portion of another mat constructed in accordance with the principles of my invention and shown in conjunction with the filtering medium and the deckle.

Fig. 13 is a plan view of a portion of a mat similar to that illustrated in Fig. 12.

Fig. 14 is a fragmentary sectional view of a portion of the apparatus illustrated in Figs. 1 and 15, showing more particularly the construction and arrangement of the suction boxes.

Fig. 15 is a side elevational view similar to Fig. 1 but showing a modified form of a complete apparatus.

Figure 4:
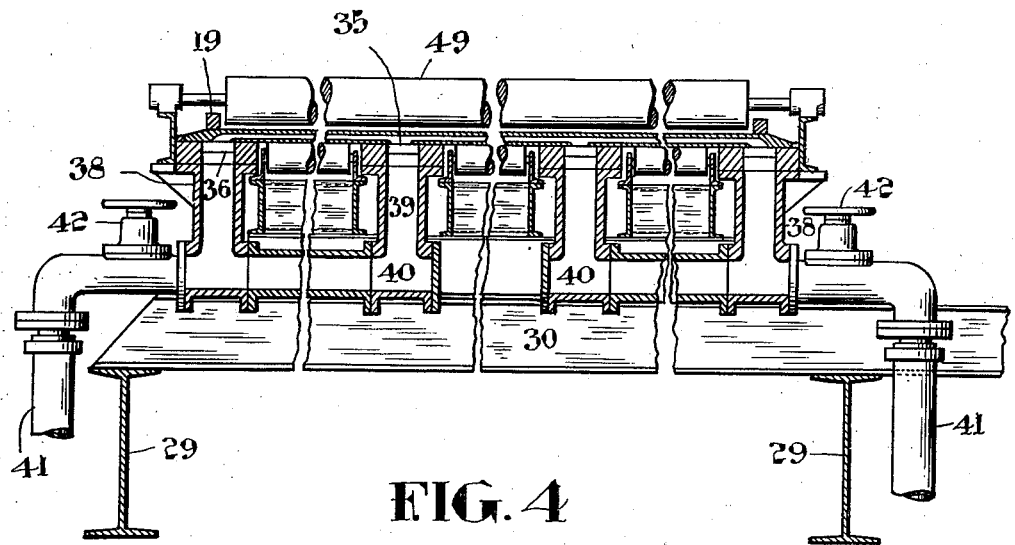
Fig. 4 is a sectional elevation of a modified type of machine similar to that shown in Fig. 3 but with side frames and intermediate suction or blowing boxes.
Figure 3:
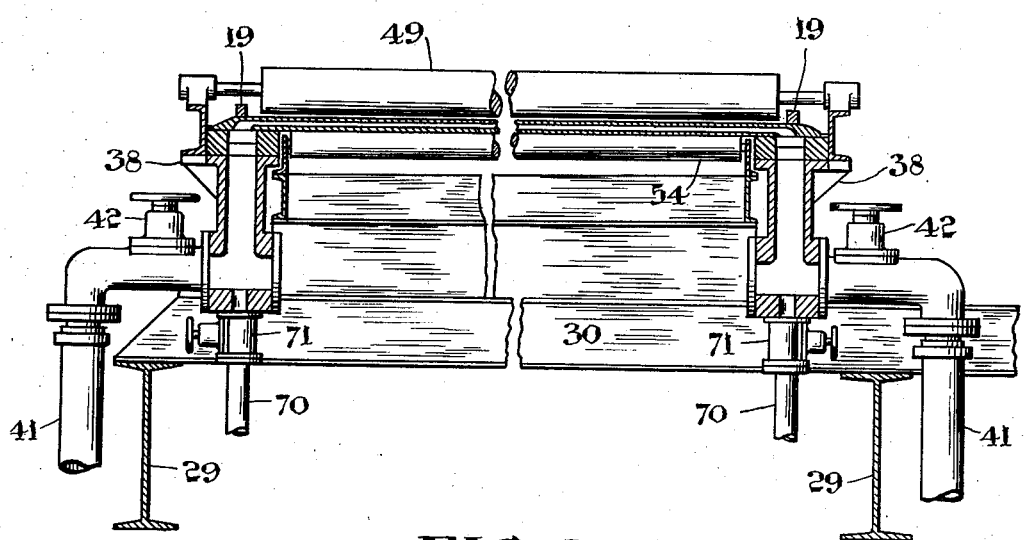
Fig. 3 is a sectional elevation taken on the line 3—3 of Fig. 1 and showing the side frame only.

Referring more particularly to the drawings, 10 designates a flow pipe through which the sludge to be dewatered is fed into a flow box 11. This flow box is substantially the full width of the cake of sludge to be dehydrated and is provided with a gate valve or slice 12. The bottom 13 of the box rests on a suitable frame 14. This frame preferably also carries one of the guide rolls 15 mounted in suitable bearings 16. The box bottom is preferably made sloping downwardly towards the gate valve side of the box to feed the material onto an apron 17 which guides the sludge towards the belt 18. Any other standard flow box may be used for the delivery of the sludge or slurries to the belt. The belt 18 is of the endless type and is of fine mesh and is suitable for draining off the fluid and retaining the solid constituents of the sludge. The machine is provided with deckle straps 19. These deckle straps are of the endless type and pass over pulleys 20 mounted on suitable shafts 21 rotating in bearings 22 bolted to frames 23. These deckle straps are spaced transversely of the machine and provide a means for regulating the width of the sludge cake. Guides 24 may be provided to hold these deckle straps in position while they are in operation. The belt 18 rests on and is adapted to move substantially in synchronism with the mat 25. This mat is of the endless type and passes over end rolls 26. These end rolls are mounted on shafts or journals 27 rotating in suitable bearings 28a. These bearings are mounted on suitable framing members 28 and 29. To hold these framing members 29 at the desired distance apart, cross members 30 are provided and these members 30 extend transversely of the machine. To hold the mat in tension suitable tensioning devices 31 of any of the well known types may be used. A simple type of tensioning device is shown. The mat 25 is provided with a plurality of transversely extending channels 33 terminating short of the side edges of the mat. These channels may be in the form of slots open to the outer surface of the mat along their entire length, as shown in Fig. 7, or they may comprise internal channels having a series of openings leading therefrom to the outer surface of the mat, as shown in Fig. 5. The latter construction prevents the belt sagging into the channels under the weight of the sludge carried thereon or being drawn into the channels by the suction to which the belt is subjected during its passage over said channels. The ends of the slots or channels 33 communicate with ports 34 leading to the inner surface of the mat, as shown in Figs. 3, 4 and 5. In some cases the mat may also be provided with intermediate ports 35 leading from each channel 33 to the inner surface thereof, as shown in Fig. 4. The ports 34 are adapted to register successively with ports 36 formed in the upper surfaces 37 of the side frames 38 when these only are employed or in the case of the modification shown in Fig. 4, the ports 34 and 35 are adapted to successively register with ports 36 in frames 38 and ports 39 in the upper surfaces of the frames 40. These frames are in reality suction or blower boxes and connected to a source or sources of suction or blowing through the pipes 41. Suitable valves 42 are placed in the pipes to control these drying mediums. The belt is run over suitable guide pulleys 43 and said belt is so mounted that it extends beyond the end rolls so that the sludge cake may be carried in its dry state to a suitable conveyor shown diagrammatically at 44. The belt has tensioning means, one form of which is shown at 45. Mounted so that it will ride on the top of the sludge cake is an endless belt 46. This belt passes over rolls 47 extending transversely of the machine. The rolls have journals 48 rotatably mounted in vertically adjustable bearings 49. Intermediate the end rolls are vertically adjustable squeeze rolls. The belt 46 extends over the entire width of the machine and is adapted to press on the sludge cake and assist in squeezing the fluid therefrom.

Figure 2:
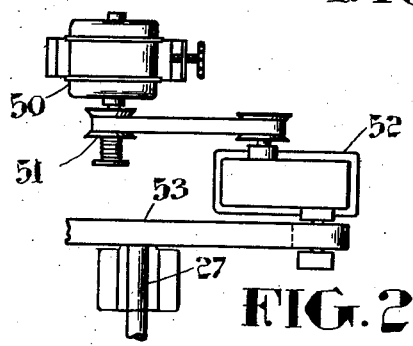
Fig. 2 is a plan view of a driving unit suitable for the machine shown in Fig. 1.

A suitable driving unit is shown in Fig. 2. A motor 50 is connected by a variable speed driving unit 51 of any of the well known types to a reducer 52 which is connected by a belt and pulley mechanism 53 to the shaft or journal 27 which, in turn is connected to the end rolls 26. To hold the mat at the desired level a plurality of table rolls 54 are rotatably mounted below the mat and contact therewith. These table rolls hold the mat in substantially the horizontal position and insure that the mat will not sag under the weight of the sludge. Skids may be used in place of table rolls. Between the underside of the mat and the frame a suitable liquid seal 55 is provided. This may consist of a plurality of grooves on each side of the ports in the frames and surrounding same. The fluid which may be fed through the pipe 56 into the water chambers 56a and upwardly through holes into the grooves, seals the mat and also provides a lubricant for the mat. Other forms of liquid sealing means, not shown, may be used instead of the type shown herein. A beater 57 may be provided and driven by any suitable means to release the sludge from the belt. The belt may also be cleaned by means of a spray pipe 58, connected to a suitable source of water supply, not shown. The mat shown in Fig. 7 has cross channels 60 communicating with vertical channels or openings 61 slightly smaller and on the top of the mat raised sections are provided, these sections being between the grooves. The raised sections 61 are herein shown as comprising rib-like projections extending in zigzag fashion across the upper surface of the mat between the grooves 60. These raised portions or projections engage the inner surface of the foraminous belt 18 and serve to hold the latter away from the mouth portions of the intervening grooves 60. They also serve to reduce the wear on the belt by reducing the area of contact between the belt and the mat, it being noted that the width of each raised portion or projection in contact with the belt is less than the width of the upper portions of the mat which lie between the grooves.

The mat illustrated in Fig. 8, and comprising one preferred form of mat constructed in accordance with the provisions of my invention, is, as previously indicated, endless in form and only a short transverse section being shown in Fig. 8 for purposes of illustration. The mat shown in Fig. 8 comprises a body portion 75 which, in its central area intermediate its edges 76, is provided with a plurality of transversely extending grooves or passages 77 opening on the upper face of the mat in grooves 78. The opposite ends of the passages 77 extend downwardly as at 79 respectively terminating in spaced elongated ports on the lower or inner face of the mat.

The upper surface of the mat, intermediate the grooves 78, is provided with a plurality of closely spaced projections 80 shown in Fig. 8 in the form of V-shaped ribs extending substantially, altho not necessarily, normal to the transverse grooves 78.

At this point it may be well to note that when operating upon fine slurrys and sludges it is usually necessary to employ a relatively fine mesh filtering medium, such as silk, etc. When such a filtering medium is employed it is necessary to so form the belt or mat supporting the same that the fine and structurally, relatively weak filtering medium is supported in a substantially flat plane in the operating area. If the fine filtering medium, such as silk, etc., is supported only at points which are considerably spaced from one another, the filtering medium will sag into the spaces between such supporting areas, thereby reducing the efficiency thereof as well as materially increasing the rate of wear thereon.

To this end I have provided a mat or belt as shown in Fig. 8 which presents a substantially continuous supporting area for the filtering medium. This is accomplished by providing relatively narrow transversely extending openings or grooves 78 which may vary in width from about one-eighth inch to about one and one-half inch depending upon the nature of the filter web to be supported thereby as well as the type of service in which the apparatus is to be used and such grooves 78 are preferably considerably narrower than the width of the supporting area of the mat therebetween. The maximum distance at which the transverse openings or grooves 78 may be spaced longitudinally of the belt depends, of course, upon the service for which such belt is designed. I have found that for most uses the distance between openings or grooves 78 may vary from approximately twice the width of the grooves 78 to not more than fifteen times the width of such grooves. A specific example of belt which has been tested has employed grooves 78 approximately one-fourth of an inch wide and spaced on one and one-fourth inch centers.

As previously indicated, the upper surface of the mat area, between the openings 78, is provided with a plurality of serrations or projections 80. The distance at which the projections 80 may be spaced will vary in accordance with the nature of the material to be supported thereon. If a fine silk screen is employed, distances between crests of projections 80 may be as low as one-eighth of an inch or less, and if the filtering medium is a heavy duck or metallic medium, the distances between crests may be extended to approximately one inch.

Instead of providing the upper surface of the mat or belt as shown in Fig. 8 with integral projections or serrations to provide a drained supporting area for the filtering medium intermediately of the openings 78 I may prefer to form such supporting area of a relatively smooth surface and to then superimpose upon such surface a foraminous auxiliary belt generally indicated at 81 in Fig. 12. The foraminous belt 81 will preferably lie in a shallow circumferential depression on the outer periphery of the mat so as to support the filtering medium generally indicated at 82 in substantially the same plane with the lateral edges 83 of the mat proper. The deckle straps 84 resting upon the lateral edges of the filtering medium 82 and in turn resting upon the lateral impervious edges 83 of the mat, will tend to maintain the filtering medium in proper relationship to its support in addition to their usual function in defining the width of the filter cake.

The suction boxes and their associated water sealing and lubricating means, generally indicated at 38 in Fig. 5, are shown in Fig. 9 associated with a belt formed in accordance with the structure illustrated in Fig. 8. Inasmuch as the formation of the suction boxes illustrated in Fig. 9 is substantially identical with that illustrated in Fig. 5, similar reference characters will be employed to designate like parts.

At this point it may be well to note that the suction box, or more particularly the bridge wall 36, across its upper face is provided with a plurality of relatively small ports or openings. This bridge wall 36 with the plurality of relatively small openings is provided across the suction ports so as to preclude such ports, due to the vacuum therein, from pulling into the suction ports the portions between the adjacent openings 79 on the mat. The relatively small openings in the bridge wall 36 will preferably be reamed at their upper ends so as to eliminate all sharp corners with which the belt is in engagement.

The conduits 56 leading into the water sealing passages, and by which sealing water is supplied to the underface of the mat through the passages 55, will preferably be connected to some suitable source of water supply. In this connection it may be noted that while a certain amount of pressure on the water in the conduit 56 is essential and desirable nevertheless too great a pressure will merely result in the discharge of a surplus of water into the suction ports. In practice it has been found that a pressure of from two to ten pounds per square inch is most effective. It is within the contemplation of my invention, of course, to employ materials other than water for the purpose of sealing the belt around the suction ports and to provide lubrication between the belt and its supporting standard within which the suction ports 56 are formed. If a material is operated upon which contains certain gummy or waxy constituents it may be advisable to include in the sealing liquid some component which will serve as a solvent for any deposits which may occur between the mat and its supporting surface, thus always maintaining a clean surface of minimum friction.

The belt or mat, generally indicated at 85 in Fig. 11, and its associated supporting means, which includes the suction boxes and sealing means, is substantially identical in general construction with the previously described forms of construction differing, however, in the fact that the mat 85 instead of being provided with openings such as 79 in Fig. 8 along opposite edges of the mat, is provided with openings 86 disposed intermediately of the edges of the mat and having communication with the intermediate portions of the openings or grooves 78'. The supporting means for the mat, including the suction boxes and sealing means, will be substantially identical with those previously described excepting that when a mat such as 85 is employed the suction boxes will be positioned intermediately of the edges of the mat. At this point it may be well to note that it is within the contemplation of this invention to provide a machine of the character described in which the suction mat or belt has only a single row of spaced openings 86 positioned substantially centrally between the edges of the mat especially when belts or mats of relatively narrow width are employed. When only a single row or a plurality of rows of openings such as 86 are provided intermediately of the edges of the mat, as shown in Fig. 11, the suction standards need engage the mat only in areas slightly wider than such openings with the remainder of the belt width supported on rollers generally indicated in Fig. 4.

When a belt or mat is employed utilizing either the longitudinally extending ridges or serrations 80 as illustrated in Fig. 8, and the foraminous supporting belt 81 such as illustrated in Fig. 12, there should be some provision for sealing the operative surface of the belt or mat against longitudinal seepage of air and consequent loss of vacuum underneath the supporting medium and particularly at the ends of the machine. This may be conveniently accomplished by the provision of transversely extending bridges generally indicated at 87 in Figs. 8 and 10, or in case a foraminous supporting element such as 81 is employed, by the provision of transversely extending bridge walls generally indicated at 88 in Fig. 13 which may be conveniently formed by molding or weaving a strip of rubber or other suitable material in the belt 81 at longitudinally spaced points. The projections shown in zig-zag form on the upper surface of the belt or mat shown in Fig. 7 have the dual function of providing such longitudinal seal as well as to maintain the filter medium a short distance above the flat surface of the mat or belt. It should be noted at this point that while only one row of such ridges is shown, nevertheless additional rows may be employed or the form of such ridges may assume any convenient shape so long as the spaces between adjacent ridges drain into at least one of the openings 61 and also that such rows are spaced sufficiently close together so that the fine filtering medium will not sag appreciably into the spaces therebetween.

The general assembly illustrated in Fig. 15 is substantially identical in its fundamental respects with that shown in Fig. 1, differing however, from the construction shown in the last-named figure in the following particulars.

I have found that for most materials for which my apparatus is designed to operate upon, the deckle straps 19a need not extend longitudinally throughout the entire upper run or operative surface of the filter medium but instead the drum 21a may be positioned at a point to the left of the drum 26 so that the deckle straps 19a extend over the operative surface of the filter medium for a distance just sufficient to form or define the filter cake. After the filter cake is thus formed in the opening stages of the machine it is no longer necessary to provide deckle straps.

The restriction of the deckle straps in the manner above defined makes convenient the mounting adjacent the discharge end of the machine of apparatus generally indicated at 89 designed for the purpose of engaging the upper surface of the filter cake and to withdraw therefrom moisture which in practice has been found to be concentrated in such upper surface.

The apparatus generally indicated at 89 comprises a stationary suction member generally indicated at 90 provided with suitable suction pipe connections (not shown) and a slot extending longitudinally of the face of such member on its lower surface. A foraminous belt 91 trained about a driving pulley 92 and an idler pulley 93 passes underneath the suction member 90 and is preferably driven at substantially the same speed as the lineal velocity of the suction cake passing under the suction member 90. The suction member 90 may be supported by means of springs such as 94, or any suitable form of counterbalancing arrangement, whereby the suction member 90 is held in engagement with the upper surface of the filter cake at a predetermined or regulatable pressure. The function of the apparatus 89 will be hereinafter more fully defined in conjunction with the description of the operation of the apparatus generally.

Positioned adjacent the lower and return run of the filter medium 94 are spray pipes generally indicated at 95 and 96 and so arranged as to project a treating medium or mediums, hereinafter more fully defined, against both the inner and outer surfaces of such filter medium. Likewise mounted in the lower frame of the machine are spaced standards 97 which rotatably support therebetween wringer rolls 98, one of which, such as the lower, may be suitably supported by adjustable or resilient means 99 by which the pressure between such rolls, i. e., their pressure against the filter medium 94, may be adjustably controlled.

It will be noted that while the wringer rolls 98 have been shown positioned in engagement with the lower or horizontal run of the filter medium, it is, nevertheless, within the contemplation of my invention to position such wringer rolls in such manner that the filter medium or web extends vertically while passing through such rolls to facilitate the removal of the liquid from the web as it passes between the rollers; furthermore, the spray pipes 95 and 96 may likewise be positioned so as to project the treating medium against the filter web in a position where such web moves in a vertical direction.

In Fig. 14 there is, as previously indicated, illustrated in sectional view one of the suction boxes along with a fragmentary portion of one adjacent suction box to illustrate the relationship between such boxes. Attention is directed to the fact that there is an appreciable longitudinal distance, generally indicated at 100, between adjacent perforated bridge walls 36 of contiguous boxes in which area 100 the belt or mat passing over the suction boxes is not subjected to the suction of such boxes. The purpose of such blank area will be hereinafter more fully explained.

The operation of the previously described forms of construction may be briefly described as follows:—

An apparatus such as that illustrated in Fig. 1 is employed. The material to be treated is fed onto the traveling filter belt 18 by means of the flow box 11. As the material flows onto the filter medium 18, the water passes downwardly therethrough leaving a deposit of the solid material on the filter medium 18. Such downward flow of water is augmented by the suction on the underface of the filter medium induced by the suction boxes being in communication with the suction ports formed in the belt or mat. As the filtering material progresses to the right, as viewed in Fig. 1, it passes under the squeeze belt 46, the effect of which is to assist the action of gravity and suction in liberating the water component of the cake.

As previously indicated, it is within the contemplation of my invention to employ one or more of the so-called suction boxes as blower boxes, i. e., in Fig. 1 the intermediate or central box may be connected with a source of fluid such as air under pressure. The subjecting of the filter cake to this blowing action not only results in a reversal of the direction of air flow through the filter cake but also has a tendency to raise it, if only in a superficial manner, from the filter medium or belt 18 so as to break the seal which has begun to build up over the surface of the filter medium. The main belt 25, as well as the filter medium 18, being held down by the squeeze belt 46 will tend to maintain the proper sealing engagement between the belt 25 and the suction standards, if the downward force on such belt over the two terminal suction boxes should not be sufficient for such purpose. The squeeze belt 46 also maintains the filter cake on the filter medium during this reversal of the direction of air flow therethrough so that when the filter cake passes over the last suction box it will have been disturbed only to a sufficient degree so as to again permit an efficient down flow of air therethrough, induced by the last suction box.

The general operation of the assembly illustrated in Fig. 15 is substantially identical with that just described for the apparatus illustrated in Fig. 1. In addition, however, the apparatus in Fig. 15 is capable of producing the following further results.

The apparatus generally indicated at 89 in Fig. 15 is in effect an auxiliary suction device positioned adjacent the discharge end of the machine and particularly engages the upper surface of the filter cake. It has been found that when operating upon a material in which the solids are unusually fine, the upper surface of the cake at the discharge end of the machine has a relatively higher water content than that portion adjacent the cake next adjacent to the filter medium. Passing the filter cake past the apparatus 89 not only removes an appreciable amount of water from the upper surface of the cake but in addition, such apparatus tends to lift the cake off from the filter medium and thus facilitate discharge of the cake from the right hand end of the machine.

The above described auxiliary suction apparatus, generally indicated at 89, it will be noted, may be used in conjunction with any of the conventional types of filter apparatus in which a cake of the material being filtered is built up upon a foraminous filter belt, whether such belt be horizontal or mounted on a drum or otherwise arranged.

As previously explained, conduits 95 and 96 are provided for the purpose of projecting streams of treating media against one or both surfaces of the finer filtering cloth. It is within the contemplation of my invention to not only employ air, water, etc. as aerating, washing, etc., means but also to employ in one or both of the conduits 95 and 96 materials which will chemically react with components of the filter medium to prepare the same for the next run. As an example, in the filtering of activated sludge it becomes necessary to treat the belt with an acid wash to neutralize the coagulents used to flocculate the sludge. The wringer rolls 98 are provided for the purpose of squeezing out of the belt any liquid which may be present therein, either as a result of previous use or any of the above mentioned forms of treatment to which the filter medium has been subjected, and which may be either objectionable or undesirable in the belt in its return service.

It has been found that if the filter cake is intermittently subjected to suction, i. e., if periods of rest are permitted in the suction operation, more efficient elimination of the liquid results. To this end the suction boxes are formed, as illustrated in Fig. 14, i. e., areas between contiguous boxes are provided in which the mat or belt is not subjected to any suction. In such rest periods the filter cake is permitted to undergo certain changes resulting from either the effect of gravity or relieving of stresses, etc., so that when suction is reestablished the liquor will be withdrawn therefrom more efficiently than if the suction had been maintained continuously.

Intermittently subjecting the mat, such as illustrated in Fig. 10, to suction in the manner above explained, has the following additional advantageous result: When the grooves 78 are evacuated, the effect of such evacuation will be to draw the righthand edge of the generally T-shaped mat section between passages 77 slightly downwardly, which, due to the resultant nature of the mat, will spring upwardly into engagement with the under surface of the filter web as soon as such suction is released. The intermittent application of suction, therefore, results in a mechanical agitation of the filter web with a consequent loosening of the filter cake supported thereon, thus facilitating the passage of the air therethrough and a consequent drying of the same.

The apparatus constructed in accordance with the principles of my invention has a particular advantage in the reduction of area or sliding contact between the mat and the area adjacent the suction boxes, which is an important factor in a determination of the power required to drive the machine. The form of construction illustrated in Fig. 11, in which the suction ports and openings in the mat are arranged intermediately of its edges, is particularly efficacious in accomplishing this result especially when rollers are employed for the purpose of supporting the lateral surfaces of the mat adjacent the suction boxes.

In Fig. 15 the flow box is shown of slightly different form than that illustrated in Fig. 1. The flow box illustrated in Fig. 15 comprises an elongated trough 101 provided with a depending baffle 102 to one side of which the material to be treated is introduced by means of conduit such as 103. A weir at 104 is provided across which the material to be treated flows on its way downwardly over the apron 105. Mounted within the trough 101 and adjacent the weir 104 is a substantially helical shaped flexible wiper 106 arranged to engage the edge of the weir 104 and thus remove from the same any accumulation of material which might otherwise occur, and thus keeping the edge of the weir 104 at uniform height to insure uniform depth of flow transversely of the weir.

The hereinafter described apparatus is particularly useful in the mining industry and especially in the filtration of concentrates of the character in which the concentrates contain the values sought to be recovered. With the machine as shown, having a number of distinct and separately controlled suction boxes, it has been demonstrated that it is practical to utilize the first few boxes for the extraction of the liquor containing values, and to introduce by means of the spray pipe 94a on the top of the filter cake thus formed a clear neutral solution which acts as a wash and on further progress of the cake towards the delivery end of the machine further boxes extract the dilute charge with its carried values. In connection with the operation of the filter, in the metallurgic recovery field, on materials in which the solids have a high specific gravity, it is necessary to keep such materials agitated in the flow box to prevent settling of the solids so that for this use instead of the wiper 106 referred to in the foregoing description, an aggressive agitator is preferably employed.

It should be noted that it is within the contemplation of my invention to introduce to the filter tape by means such as the spray pipe 94a a material which may have various influences upon the cake such as to change its physical or chemical characteristics. The projection of the stream of fluid, either liquid or air, into the formed filter cake will have a tendency to open the physical structure of the cake to permit a more efficient flow therethrough of the drying air as the cake passes over the last suction boxes in the machine. It may also be desirable and highly essential in the treatment of certain materials that some substance capable of chemically reacting in a desirable manner with the filter cake be introduced thereto by means of the spray pipe 94a. It is to be understood, of course, that instead of employing only one spray pipe such as 94a, any suitable number may be arranged over the upper run of the filter medium.

The material introduced through the spray pipes such as 94a may be not only for the purpose of treating or varying the characteristics of the filter cake but may also be for the purpose of varying the character of the liquid withdrawn from such cake, i. e., if a particular change in the characteristics of the liquid is desired, the same may be conveniently accomplished by the introduction of a suitable medium through the spray pipes such as 94a.

As previously indicated, the type of apparatus herein disclosed characterized by the fact that the filter medium and its supporting mat or belt may be sprayed throughout substantially the entire extent of the return run of these elements, makes possible the treatment or reconditioning of either one of such elements before they again pass into the active zone at the upper lefthand end of the machine. It is to be understood, of course, that when the mat and the filter medium are thus sprayed, either one, particularly the latter, may be conveniently passed through washing or treating baths instead of projecting the treating medium thereagainst as previously explained and illustrated in the drawings.

When operating upon materials having a relatively high water content, and when such materials are flowed onto the filter medium at a relatively high rate, some provision should be made to prevent such material from flowing to the left underneath the apron from the feed box and off from the end or edge of the web 18 at the upper lefthand end of the machine. In order to accomplish this, the feed apron may be carried down into substantial engagement with the filter web as shown in the drawings or any suitable auxiliary means, such as a roller similarly placed, may be employed to accomplish substantially the same result.

Other modes of applying the principle of my invention may be employed instead of the one explained, change being made as regards the means herein disclosed, provided those stated by any of the following claims or their equivalent be employed.

I therefore particularly point out and distinctly claim as my invention:

1. In apparatus of the character described, the combination of a stationary suction member provided with a suction port, an endless flexible suction mat provided on one surface with a drainage groove, a soft non-metallic filter web supported on said mat, means integral with said mat maintaining said filter web in slightly spaced relation to the body of said mat, and passages in said mat respectively leading from said groove to spaced openings on the body of said mat and providing communication between said groove and the suction port in said stationary member.

2. In apparatus of the character described, the combination of a stationary suction member provided with a suction port, an endless flexible suction mat provided on one surface with a plurality of spaced drainage grooves the distance between the openings of the grooves in the surface of the mat being at least twice and not more than fifteen times the width of said openings, a filter web supported on said mat, means maintaining said filter web in slightly spaced relation to the body of said mat and passages in said mat respectively leading from said grooves to spaced openings on the body of said mat and providing communication between said grooves and the suction port in said stationary member.

3. A suction mat for use in apparatus of the character described comprising a flexible endless belt provided on its outer surface with a plurality of spaced drainage grooves, the distance between the openings of the grooves in the surface of the mat being at least twice and not more than fifteen times the width of said openings and the space between said grooves provided with a plurality of projections arranged to present filter web supporting areas spaced not more than one-half inch apart and passages in said belt leading from said grooves to spaced suction ports on the body of said belt.

4. In apparatus of the character described the combination of a stationary suction member provided with a suction port, an endless flexible suction mat provided on one surface with a plurality of drainage grooves, the face of said mat between said grooves provided with a plurality of projections presenting supporting areas spaced not more than one-half inch apart, a filter web supported on said projections and passages in said mat respectively leading from said groove to spaced openings on the body of said mat and providing communication between said grooves and the suction port in said stationary member.

5. A suction mat for use in apparatus of the character described, comprising a flexible endless belt provided on its outer surface with a plurality of alternate grooves and lands, said lands so formed that each provides an extended area for the support on said mat of a filter web, suction ports on the body of the belt respectively in communication with said grooves, and narrow sealing ridges on said lands extending transversely of said belt between said grooves and dividing the outer surface of the same into a plurality of suction areas.

6. A suction mat for use in apparatus of the character described, comprising a flexible endless belt provided on its outer surface with a plurality of alternate grooves and lands extending transversely of the line of travel of said belt, said lands so formed that each provides an extended area for the support on said mat of a filter web, suction ports on the body of the belt respectively in communication with said grooves, and narrow sealing ridges on said lands likewise extending transversely of the line of travel of said belt and dividing the outer surface of the same into a plurality of suction areas.

7. In apparatus of the character described the combination of a stationary suction member provided with a suction port, an endless flexible suction mat provided on one surface with a plurality of spaced suction openings arranged to successively register with the suction port in said stationary member and a bridge wall across the mouth of said suction port dividing the same into a plurality of relatively small openings, said suction openings so proportioned as to size with respect to the size of said relatively small openings that said suction openings may, at all times, while over the stationary suction member, register with a plurality of said small openings.

8. The combination with apparatus of the character described provided with an endless filter web upon which the material being treated is supported and conveyed through the apparatus, of suction means arranged to engage the upper surface of said material being treated as the same is being conveyed on said filter web past said suction means and toward the discharge end of the machine.

9. In apparatus of the character described the combination of an endless flexible suction mat provided on one surface with drainage grooves and passages underlying said grooves, wider than the latter and leading from such grooves to a plurality of suction openings on the inner periphery of the belt, said openings aligned intermediately the lateral edges of said mat and a stationary suction member provided with a suction port and arranged to engage said mat in areas surrounding said openings.

10. In apparatus of the character described the combination of an endless flexible suction mat provided on one surface with drainage grooves and passages leading from said grooves to spaced suction openings, a suction manifold arranged to engage said mat around said openings throughout the active areas of said mat, said manifold provided with blocked areas whereby discontinuous suction areas are provided in said mat as the latter moves over said stationary members.

11. The method of removing at least a part of the liquid component from materials such as sludges, which comprises depositing the material onto a movable endless filter web, withdrawing by suction a part of the water component of the material thus deposited on said web, reversing the direction of air flow through said web to loosen the filter cake from the active surface of said web and to re-form the structure thereof and then further sucking air downwardly through said material and the filter web.

12. In apparatus of the character described, the combination of a stationary suction member provided with a suction port, an endless flexible suction mat provided on its outer surface with a plurality of drainage grooves, a foraminous belt of open mesh overlying said mat and moving at the same rate of speed, said belt provided with a plurality of spaced transversely extending impervious areas which divide the outer surface of said belt into a plurality of separate suction areas, a filter web of fine mesh overlying said foraminous belt, travelling at the same rate of speed as said belt and supported thereby on said mat and passages in said mat respectively leading from said grooves to spaced openings on the body of said mat and providing communication between said grooves and suction port in said stationary member.

13. In apparatus of the character described, the combination of a flexible endless belt provided on its outer surface with a plurality of elongated projections spaced not more than one-half inch apart, a soft non-metallic filter web supported on said projections, passages in said mat terminating in suction ports on the body of the mat, and a plurality of elongated openings extending from said passages to areas on the outer surface of said mat, said elongated openings and elongated projections arranged angularly with respect to each other on the face of said mat whereby there are provided a plurality of relatively narrow grooves on the face of said mat each leading into at least one of said openings.

WILLIAM R. THOMSON.